United States Patent
Spencer et al.

(10) Patent No.: US 7,235,606 B2
(45) Date of Patent: Jun. 26, 2007

(54) GLASS-FILLED PROPYLENE POLYMER COMPOSITION

(75) Inventors: Lana S. Spencer, Midland, MI (US); Michael Plaver, Midland, MI (US); Sam Crabtree, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/567,640

(22) PCT Filed: Aug. 4, 2004

(86) PCT No.: PCT/US2004/025167
§ 371 (c)(1), (2), (4) Date: Feb. 8, 2006

(87) PCT Pub. No.: WO2005/021644
PCT Pub. Date: Mar. 10, 2005

(65) Prior Publication Data
US 2006/0258792 A1  Nov. 16, 2006

(51) Int. Cl.
*C08F 8/00* (2006.01)
(52) U.S. Cl. ............... 525/191; 525/192; 525/194; 525/212; 525/261; 525/240; 525/323
(58) Field of Classification Search ............... 525/191, 525/192, 194, 212, 261, 240, 323
See application file for complete search history.

(56) References Cited

U.S. PATENT DOCUMENTS

| | | | |
|---|---|---|---|
| 3,893,989 A | 7/1975 | Leicht et al. | |
| 4,113,802 A | 9/1978 | Matteoli et al. | |
| 4,997,875 A * | 3/1991 | Geddes et al. | 524/504 |
| 5,916,953 A | 6/1999 | Jacoby et al. | |
| 6,472,473 B1 * | 10/2002 | Ansems et al. | 525/191 |
| 2003/0069362 A1 * | 4/2003 | Ramanathan et al. | 525/240 |

FOREIGN PATENT DOCUMENTS

| | | |
|---|---|---|
| EP | 346840 | 12/1989 |
| WO | WO99/10424 | 3/1999 |
| WO | WO03/029344 | 4/2003 |

OTHER PUBLICATIONS

U.S. Appl. No. 09/133,576, filed Aug. 27, 1997, Cummins et al.
"Impact Propylene Copolymers", E.P. Moore Jr., Polypropylene Handbook, Hanser Publishers, 1996. pp. 220-221.

* cited by examiner

*Primary Examiner*—Ling-Sui Choi

(57) ABSTRACT

Disclosed is a glass-filled coupled impact propylene copolymer composition having an improved combination of strength, stiffness, impact properties and melt strength; articles made therefrom; and a process to prepare said articles.

10 Claims, No Drawings

GLASS-FILLED PROPYLENE POLYMER COMPOSITION

This invention relates to strong, stiff, and tough glass-filled impact propylene copolymer composition, an article prepared therefrom and a method for preparing said article.

Polypropylene has been used in many applications in the form of injection molded and extruded articles, film, sheet, etc., because it is excellent in molding processability, toughness, moisture resistance, gasoline resistance, chemical resistance, has a low specific gravity, and is inexpensive. Advances in impact modification have further expanded the versatility and uses of propylene polymers. To improve the impact properties of polypropylene homopolymers (and random copolymers), an elastomeric component is typically added, either by way of the production of an in-reactor blend of a propylene polymer and an elastomeric component (an impact propylene copolymer) or by way of compounding of a propylene polymer and an elastomeric component. In the former method the propylene polymer and the elastomeric component are produced in one or more reactors of the same process. The use of impact modified propylene polymers is expanding at an increasing rate in the fields of exterior and interior automotive trims, in electrical and electrical equipment device housings and covers as well as other household and personal articles.

Automotive articles are ordinarily processed by injection molding. However, there are many components of automobiles wherein such parts are hollow and to manufacture these by injection molding is very difficult and expensive. Many such parts, particularly large parts, can conceivably be made by blow molding provided the polymer has adequate processing properties such as high melt strength and end product properties such as strength, stiffness, and toughness, especially low temperature toughness. It is known that commercially available propylene polymers for injection molding and extrusion have excellent properties, but lack a combination of good melt strength, strength, stiffness and toughness.

US 2003/0069362 A1 describes attempts to modify coupled propylene polymers by compounding in an elastomeric component with mineral filler. The resulting coupled propylene polymer compositions provide adequate melt strength and toughness, but not stiffness. U.S. Pat. No. 5,916,953 describes stiff, strong and tough glass-filled propylene polymers, which lack good melt strength. U.S. Pat. No. 6,472,473 B1 describes coupled impact propylene copolymers with good melt strength and impact properties, especially good low temperature impact properties, however improved strength and stiffness properties are not addressed.

What is desired is an impact propylene polymer composition which provides a good balance of strength, stiffness, impact properties and melt strength.

Accordingly, a major objective of the present invention is the provision of an impact propylene polymer composition which provides a good balance of strength, stiffness, impact properties and melt strength; articles made therefrom; and a process to prepare said articles.

The glass-filled coupled impact propylene copolymer compositions of the present invention comprise a coupled impact propylene copolymer, a glass fiber, and optionally a functionalized olefin polymer in a sufficient amount to act as a compatibility agent between the coupled impact propylene copolymer and the glass fiber. Preferably the impact propylene copolymer is coupled with a sulfonyl aide, most preferably 4,4'-oxy-bis-(sulfonylazido)benzene and the functionalized olefin polymer is a propylene homopolymer grafted with maleic anhydride.

In another aspect, the glass-filled coupled impact propylene copolymer composition of the present invention is fabricated into an article by sheet extrusion, profile extrusion, compression molding, injection molding, gas assisted injection molding, calendering, vacuum forming, thermoforming, extrusion blow molding or combinations thereof, preferably blow molding.

In a further aspect, the glass-filled coupled impact propylene copolymer composition of the present invention fabricated into an automotive article, such as a seat back, a head rest, a knee bolster, a glove box door, an instrument panel, a bumper facia, a bumper beam, a load floor, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

In yet another aspect, the present invention is a method to blow mold the glass-filled coupled impact propylene copolymer composition of the present invention into a fabricated article comprising the steps of: extruding the glass-filled coupled impact propylene copolymer composition in an extruder through a die, forming a molten tube-shaped parison, holding the parison within a shaping mold, blowing a gas into the mold so as to shape the parison according to the profile of the mold and yielding a blow molded automotive article.

As used herein, the following terms shall have the following meanings:

"Impact propylene copolymers" are commercially available and are well known within the skill in the art, for instance, as described by E. P. Moore, Jr in Polypropylene Handbook, Hanser Publishers, 1996, page 220-221 and U.S. Pat. Nos. 3,893,989 and 4,113,802. The term "impact propylene copolymer" is used herein to refer to heterophasic propylene copolymers where polypropylene is the continuous phase and an elastomeric phase is dispersed therein. Those of skill in the art recognize that this elastomeric phase may also contain crystalline regions, which for purposes of the current invention are considered part of the elastomeric phase. The impact propylene copolymers result from an in-reactor process rather than physical blending. Usually the impact propylene copolymers are formed in a dual or multi-stage process, which optionally involves a single reactor with at least two process stages taking place therein, or optionally multiple reactors.

"Coupling agent" means a chemical compound that contains at least two reactive groups that are each capable of forming a carbene or nitrene group that are capable of inserting into the carbon hydrogen bonds of CH, CH2, or CH3 groups, both aliphatic and aromatic, of a polymer chain. The reactive groups together can "couple" polymer chains. It may be necessary to activate a coupling agent with heat, sonic energy, radiation or other chemical activating energy, for the coupling agent to be effective for coupling polymer chains. Examples of chemical compounds that contain a reactive group capable of forming a carbene group include, for example, diazo alkanes, terminally-substituted methylene groups, and metallocarbenes. Examples of chemical compounds that contain reactive groups capable of forming nitrene groups, include, but are not limited to, for example, phosphazene azides, sulfonyl azides, formyl azides, and azides.

The process to produce the improved glass-filled coupled impact propylene copolymer of the present invention involves coupling of an impact propylene copolymer using a coupling agent. Preferably, the impact propylene copolymers have a continuous phase, which is comprised of a propylene polymer, and an elastomeric phase. The propylene polymer of the continuous phase typically will be a homopolymer propylene polymer or a random propylene copolymer, more typically a homopolymer propylene polymer. The propylene polymer may be made using Ziegler-Natta catalyst, constrained geometry catalyst, metallocene catalyst, or any other suitable catalyst system. When the propylene polymer making up the continuous phase is a homopolymer propylene polymer, the crystallinity of the propylene polymer, as determined by differential scanning calorimetry, is preferably at least 50 percent, more preferably at least 55 percent, most preferably at least 62 percent. The methods for determining percent crystallinity using a differential scanning calorimetry are known to one of skill in the art.

The elastomeric phase may be made using constrained geometry catalyst, Ziegler-Natta catalyst, metallocene catalyst, or any other suitable catalyst.

The coupling reaction is implemented via reactive extrusion or any other method which is capable of mixing the coupling agent with the impact propylene copolymer and adding sufficient energy to cause a coupling reaction between the coupling agent and the impact propylene copolymer. Preferably, the process is carried out in a single vessel such as a melt mixer or a polymer extruder, such as described in U.S. patent application Ser. No. 09/133,576 filed Aug. 13, 1998. The term extruder is intended to include its broadest meaning and includes such devices as a device which extrudes pellets as well as an extruder which produces the extrudate for forming into films, injection molded articles, blow molded articles, profile and sheet extruded articles, foams and other articles.

The preferred coupling agent is a poly(sulfonyl azide), more preferably a bis(sulfonyl azide). Examples of poly (sulfonyl azides) useful for the invention are described in WO 99/10424. Poly(sulfonyl)azides include such compounds as 1,5-pentane bis(sulfonyl azide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

When a bis(sulfonyl azide) is used for the coupling agent, preferably an amount equal to or greater than 100 parts per million (ppm) of azide is used for coupling the impact propylene copolymer, based on the total weight of the impact propylene copolymer, more preferably an amount equal to or greater than 150 ppm of azide, most preferably an amount equal to or greater than 200 ppm of azide is used. In some instances, such as where a large reduction in the ductile-to-brittle transition temperature is desirable as compared with the base comparable noncoupled impact propylene copolymer, an amount equal to or less than 450 ppm of bis(sulfonyl azide), preferably an amount equal to or less than 300 ppm of bis(sulfonyl azide) based on the total weight of the impact propylene copolymer is used for coupling the impact propylene copolymer. It is important in choosing the impact propylene copolymer to be coupled, that a polymer is chosen that has a high enough melt flow rate, so that after coupling with the desired amount of coupling agent, the coupled impact propylene copolymer will have a sufficiently high melt flow rate to be readily processed.

Glass fibers used in this invention typically are chopped to a length of ⅛ to ½ inch (3 to 13 millimeter (mm)), preferably 3/16 to 5/16 inch (5 to 8 mm) and, optionally, are coated with a sizing agent, preferably a silane sizing agent. The diameters of typical glass fibers useful in this invention range from 4 to 25 micrometers (□m), preferably 5 to 15, □m. The amount of glass fiber contained in the compositions of this invention is sufficient to increase stiffness of the compounded product as measured by flexural modulus, and typically range from an amount of 10 weight percent to 70 weight percent of the total glass-filled coupled impact propylene copolymer composition. The amount of glass filler used in a product of this invention can vary depending upon the balance of properties desired with more glass loading producing a stiffer end material. For a suitable balance of melt strength, toughness, stiffness, and strength incorporation of the glass fiber in an amount of 10 to 60 weight percent is preferred and more preferably in an amount of 25 to 50 weight percent. A composition with 20 to 40 weight percent glass fiber was found to be particularly advantageous in obtaining a balance between stiffness and strength as measured by tensile properties, and toughness as measured by impact properties.

The composition of this invention optionally includes a functionalized polyolefin polymer to provide adhesion between the coupled impact propylene copolymer matrix and the glass fibers. Typically, these functionalized olefinic polymers are graft copolymers of the polyolefin with an unsaturated organic compound suitable for graft modification of the polyolefin. The unsaturated organic compound prior to grafting, preferably contains at least one site of ethylenic unsaturation and at least one carbonyl group (—C=O). Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, methyl crotonic, and cinnamic acid and their anhydride, ester and salt derivatives, if any. Maleic anhydride is the preferred unsaturated organic compound containing at least one site of ethylenic unsaturation and at least one carbonyl group.

The unsaturated organic compound is used in an amount such that, after grafting to the polyolefin, it constitutes by weight is equal to or greater than 0.01 percent, preferably equal to or greater than 0.05 percent, more preferably equal to or greater than 0.1 percent, more preferably equal to or greater than 0.5 percent, and most preferably equal to or greater than 1.0 percent based on the weight of the polyolefin polymer. The maximum amount of unsaturated organic compound content can vary to convenience, but typically constitutes by weight less than or equal to 20 percent, preferably less than or equal to 15 percent, more preferably less than or equal to 10 percent, more preferably less than or equal to 5 percent, and most preferably less than or equal to 2 percent based on the weight of the polyolefin polymer.

The unsaturated organic compound containing at least one carbonyl group can be grafted to the polyolefin by any known technique, such as those taught in U.S. Pat. No. 3,236,917 and U.S. Pat. No. 5,194,509. For example, polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. Alternatively, the reaction temperature is higher, for example, 210° C. to 300° C., and a free radical initiator is not used or is used at a reduced concentration. An alternative and preferred method of grafting is taught in U.S. Pat. No. 4,950,541, by using a twin-screw devolatilizing extruder as the mixing apparatus. The polyolefin and unsaturated organic compound are mixed and reacted within the extruder at temperatures at which the reactants are molten and in the presence of a free radical initiator. Preferably, the unsaturated organic compound is injected into a zone maintained under pressure within the extruder.

A preferred olefin for the functionalized olefin is a propylene polymer. The propylene polymer can be a homopolymer of propylene or a copolymer of propylene with another alpha-olefin such as ethylene. A homopolymer of propylene is preferred. A suitable functionalized propylene polymer is a maleated polypropylene with a maleation level of 0.1 to 4 weight percent, preferably 0.4 to 2 weight percent, and more preferably 0.5 to 1.25 weight percent based on the weight of the polypropylene. A suitable functionalized propylene polymer has a melt flow rate (MFR) (determined under conditions of 230° C. and an applied load of 2.16 kilo grams (kg)) of 15 to 500 gram per 10 minutes (g/10 min.), preferably 50 to 300 g/10 min. Examples of suitable maleated polypropylene are available under the tradename FUSABOND from DuPont. FUSABOND grades P MD511D, P M613-05, P MZ203D, and P MD353D are preferred. Other suitable functionalized propylene polymers are POLYBOND 3150 and POLYBOND 3200 from Uniroyal and SCC 23712 from Standridge Color Corporation.

If the functionalized olefin polymer is incorporated into the product of this invention it is present in a sufficient amount to act as a compatibilizing agent between polymeric materials and the glass fiber. Generally, the functionalized polymer is present in an amount equal to or greater than 0.1 weight percent, preferably equal to or greater than 0.3, more preferably equal to or greater than 0.5, even more preferably equal to or greater than 1, and most preferably in an amount equal to or greater than 1.5 weight percent based on the weight of the glass-filled coupled propylene polymer composition. Since the functionalized polymer is typically more expensive than the coupled impact propylene polymer, there is an economic incentive to minimize the proportion of such functionalized polymer in the total product. Generally, the functionalized polymer is present in an amount equal to or less than 20 weight percent, preferably equal to or less than 12, more preferably equal to or less than 10, even more preferably equal to or less than 6, and most preferably in an amount equal to or less than 4 weight percent based on the weight of the glass-filled coupled propylene polymer composition.

Various additives are optionally incorporated in the coupled propylene polymer composition such as, pigments, antioxidants, acid scavengers, ultraviolet absorbers, neutralizers, slip agents, antiblock agents, antistatic agents, clarifiers, waxes, flame retardants, processing aids, extrusion aids, and other additives within the skill in the art used in combination or alone. Effective amounts are known in the art and depend on parameters of the composition and conditions to which they are exposed.

Preparation of the filled thermoplastic compositions of this invention can be accomplished by any suitable mixing means known in the art, including dry blending the individual components and subsequently melt mixing, either directly in an extruder used to make the finished article (for example, an automotive part), or pre-mixing in a separate melt blending apparatus (for example, an extruder, a Banbury mixer or the like) and comminuting to pellets.

The glass-filled coupled impact propylene copolymers of the present invention are thermoplastic. When softened or melted by the application of heat, the glass-filled coupled impact propylene copolymer compositions of this invention can be fabricated into articles using conventional techniques such as sheet extrusion, profile extrusion, compression molding, injection molding, gas assisted injection molding, calendering, vacuum forming, thermoforming, extrusion and/or blow molding, alone or in combination. The glass-filled coupled impact propylene copolymer compositions can also be formed, spun, or drawn into films, fibers, multi-layer laminates or extruded sheets, or can be compounded with one or more organic or inorganic substances, on any machine suitable for such purpose. The glass-filled coupled impact propylene copolymer compositions of the present invention are preferably blow molded into fabricated articles.

A blow molded article of the present invention may be manufactured by blow molding pre-compounded pellets of the glass-filled coupled impact propylene copolymer composition of the present invention through the use of a conventional blow molding machine, preferably an extrusion blow molding machine, employing conventional conditions. For example, in the case of extrusion blow molding, the resin temperature is less than or equal to 240° C., preferably less than or equal to 230° C. and more preferably less than or equal to 220° C. Further, the resin temperature is greater than or equal to 190° C., preferably greater than or equal to 200° C. and more preferably greater than or equal to 210° C. The above mentioned glass-filled coupled impact propylene copolymer composition having a proper temperature is extruded through a die in the form of a molten tube-shaped parison. Next the parison is held within a shaping mold. Subsequently a gas, preferably air, nitrogen or carbon dioxide, is blown into the mold so as to shape the parison according to the profile of the mold, yielding a hollow molded automotive article. Examples of blow molded automotive articles are a seat back, a head rest, a knee bolster, glove box door, an instrument panel, a bumper facia, a bumper beam, a load floor, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

Alternatively, the coupling can be carried out in an extruder which also forms the blow molded article, for example, in a blow molding machine preferably an extrusion blow molding machine. The impact propylene copolymer, a coupling amount of a sulfonyl azide, glass fiber, and optionally the functionalized polymer and additional components are introduced into the blow molding machine to form a glass-filled impact propylene copolymer admixture. The admixture is exposed to a melt process temperature, sufficient to result in the coupling of the impact propylene copolymer forming a molten, glass-filled coupled impact propylene copolymer composition. The molten, glass-filled coupled impact propylene copolymer composition is extruded into a molten tube-shaped parison and the formation of a blow molded article is the same as described hereinabove.

Adequate polymer melt strength is necessary for producing acceptable blow molded articles, especially large blow molded articles such as automotive articles. If the polymer's melt strength is too low, the weight of the parison can cause elongation of the parison causing problems such as variable wall thickness and weight in the blow molded article, part blow-out, and neck down. Too high of a melt strength can result in rough parisons, insufficient blowing, and excessive cycle times. The glass-filed coupled impact propylene copolymer compositions of the present invention have a melt strength of at least 15 centi Newtons (cN), further more preferably a melt strength of at least 30 cN and can be as high as 60 cN.

To illustrate the practice of this invention, examples of the preferred embodiments are set forth below. However, these examples do not in any manner restrict the scope of this invention.

EXAMPLES

Preparation of the coupled impact propylene copolymers used in Examples 1 and 2 is as follows: The base resin was tumbled with 2000 ppm of mineral oil for 30 minutes in drums, followed by the addition of 1000 ppm of tetrakis [methylene (3,5-di-t-butyl-4-hydroxyhydrocinnamate)], which was available from the Ciba Specialty Chemicals Corporation under the trade name IRGANOX 1010, 1000 ppm of a trisarylphosphite processing stabilizer which was available from the Ciba Specialty Chemicals Corporation under the trade name IRGAFOS 168 and the desired amount of 4,4'-oxy-bis-(sulfonylazido)benzene (BSA) coupling agent. This mixture was tumbled for 30 minutes then extruded through a Werner and Pfleiderer ZSK40 twin screw extruder at a feed rate of 250 pounds per hour, a screw speed of 300 revolutions per minute and with a target temperature profile of 180/190/200/200/210/220/230/240/230/240/240° C. (from feed inlet to die).

The compositions of Examples 1 and 2 and comparative examples A and B (not examples of the present invention) are listed in Table 1, parts are by weight based on the weight of the glass-filled coupled impact propylene polymer composition. In Table 1:

"PP-1" was a coupled impact propylene copolymer using Polypropylene DC108, available from The Dow Chemical Company, which was an impact propylene copolymer with a density of 0.9 grams per cubic centimeter (g/cc) and a MFR of 0.8 g/10 min. and an ethylene content of 9 weight percent. DC108 was coupled with 150 ppm (based on the total weight of the polymers present) of 4,4'-oxy-bis-(sulfonylazido)benzene (BSA) giving a coupled impact propylene copolymer with a density of 0.9 g/cc, a MFR of 0.4 g/10 min. and a melt strength of 25 cN;

"PP-2" was a coupled impact propylene copolymer using Polypropylene C104-01, available from The Dow Chemical Company, which was an impact propylene copolymer with a density of 0.9 g/cc and a melt flow rate of 1.2 g/10 min. and an ethylene content of 9 weight percent. C104-01 was coupled with 200 ppm BSA giving a coupled impact propylene copolymer with a density of 0.9 g/cc, a MR of 0.5 g/10 min. and a melt strength of 25 cN;

"PP-3" was an impact propylene copolymer with an ethylene content of 9 weight percent, available as Propylene C105-02 from The Dow Chemical Company, having a density of 0.9 g/c, a MFR of 1.4 g/10 min. and a melt strength of 5 cN;

"PP-4" was a fractional melt propylene homopolymer available as Propylene 5D45 from the Dow Chemical Company having a density of 0.9 g/cc, a MFR of 0.7 g/1 0 min. and a melt strength of 12 cN;

"GF" was a short glass fiber commercially available as CRATEC PLUS 147A-14P 4 mm from Owens Corning having an average diameter of 14 μm, an average length of 4 mm, and 0.65 percent 147A sizing agent;

"Functionalized polymer" was a 4 MFR homopolymer polypropylene with 1.5 percent active maleic anhydride moieties commercially available as SCC 23712 from Standridge Color Corporation with a molecular weight between 150,000 to 250,000 and a minimum weight average molecular weight/number average molecular weight (Mw/Mn) of 4.5;

"Carbon Black" was available as SCC 2422 from Standridge Color Corporation; and

"IRGANOX 1010" stabilizer described herein above.

Physical properties were measured on test specimens injection molded on a Toro injection molding machine. Injection molding conditions were: Feed temperature: 140° F.; Barrel temperatures: Rear, 420° F.; Center, 430° F.; Front, 440° F.; and Nozzle, 430° F. The hold pressure was set at 500 psi. The following physical property tests were run on Examples 1 and 2 and Comparative Examples A and B, the results of these tests are shown in Table 1:

"Ash" was determined in accordance with ASTM D5630 and is reported in percent (percent);

"MFR" melt flow rate was determined in accordance with ASTM D1238 at a temperature of 230° C. and an applied load of 2.16 kg and the results are reported in g/10 min.;

"Density" was determined in accordance with ASTM D792 and the results are reported in grams per cubic centimeter (g/cc);

"$F_M$" flexural modulus was determined in accordance with ASTM D790 and the results are reported in mega Pascals (MPa);

"$T_S$" tensile strength and "$T_Y$" tensile yield were determined in accordance with ASTM D638 and the results are reported in MPa;

"Izod" was notched Izod determined according to ASTM D256 at room temperature, and according to ISO 180 at −40° C. in a standard Izod impact testing unit equipped with a cold temperature. Results are reported in kilojoules per square meter (kJ/m$^2$); and "DTUL" deflection temperature under load was determined in accordance with ASTM D648 at 0.45 MPa and the results are reported in ° C.

TABLE 1

| | Example | | Comparative Example | |
|---|---|---|---|---|
| | 1 | 2 | A | B |
| COMPOSITION | | | | |
| PP-1 | 66 | | | |
| PP-2 | | 66 | | |
| PP-3 | | | 66 | |
| PP-4 | | | | 66 |
| GF | 30 | 30 | 30 | 30 |

TABLE 1-continued

|  | Example | | Comparative Example | |
|---|---|---|---|---|
|  | 1 | 2 | A | B |
| Functionalized polymer | 2 | 2 | 2 | 2 |
| Carbon black | 1.8 | 1.8 | 1.8 | 1.8 |
| IRGOANOX 1010 | 0.2 | 0.2 | 0.2 | 0.2 |
| PROPERTIES |  |  |  |  |
| MFR, g/10 min. | 0.21 | 0.42 | 0.91 | 0.41 |
| Density, g/cc | 1.12 | 1.12 | 1.12 | 1.12 |
| Ash, percent | 29.89 | 29.75 | 29.89 | 29.71 |
| $T_S$ @ yield, MPa | 63 | 68 | 50 | 81 |
| $T_E$ @ Yield, percent | 5 | 5.05 | 4 | 3.51 |
| $F_M$, MPa | 5037 | 5000 | 4369 | 6019 |
| Izod @ 23° C., ft-lb/in | 4.5 | 4.5 | 3.4 | 2.4 |
| Izod @ −40° C., kJ/m$^2$ | 15 | 15 | 10.5 | 8 |
| DTUL @ 66 psi, ° C. | 155 | 157 | 156 | 159 |

Example 2 was blow molded into a carpet covered automotive load floor on a Davis Standard blow molding machine having a 50 pound accumulator head with a 24 inch die. Processing condition was set using 40 percent regrind of Example 2. The extruder and head temperatures were set at 400° F. to give a melt temperature of 406° F. The cycle time was 160 seconds. Carpet was added to the plastic part through an in-mold process. The load floor (including carpet) measured 35×33×0.75 inches with a weight of 4594 grams.

The blow molded load floor was evaluated according to the Daimler Chrysler PF01231 Environmental Drop Test and results are reported in Table 2:

TABLE 2

| Daimler Chrysler PF01231 Environmental Drop Test | Example 2 |
|---|---|
| Environmental Set Test | 9.5 mm deflection |
| Component Drop Test @ 23° C. | No structural damage to component |
| Component Drop Test @ −29° C. | No structural damage to component |
| Static Load Deflection @ 23° C. | 20 mm deflection |
| Impact Testing @ 23° C. | No failure or stress marks |
| Impact Testing @ −29° C. | No failure or stress marks |

As can be seen from the data in Tables 1 and 2, compositions of the present invention demonstrated a good balance of melt strength, stiffness, strength and impact properties.

What is claimed is:

1. A glass-filled coupled impact propylene copolymer composition comprising:
   (i) a coupled impact propylene copolymer,
   (ii) a glass fiber, and
   (iii) optionally a functionalized olefin polymer in a sufficient amount to act as a compatibility agent between the coupled impact propylene copolymer and the glass fiber wherein the glass-filled coupled impact propylene copolymer composition has a flexural modulus as determined by ASTM D790 of at least 5000 mPa.

2. The composition of claim 1, wherein the coupled impact propylene copolymer is formed by a reaction of a coupling agent with an impact propylene polymer.

3. The composition of claim 2 wherein the coupling agent is a sulfonyl azide.

4. The composition of claim 3 wherein the sulfonyl azide is 4,4'-oxy-bis-(sulfonylazido)benzene.

5. The composition of claim 1 wherein the functionalized olefin polymer is present in an amount from equal to or greater than about 0.1 weight percent to equal to or less than about 20 weight percent based on the weight of the coupled impact propylene copolymer composition.

6. The composition of claim 1 wherein the functionalized olefin polymer is a propylene homopolymer grafted with maleic anhydride.

7. The composition of claim 1 fabricated into an article by sheet extrusion, profile extrusion, compression molding, injection molding, gas assisted injection molding, calendering, vacuum forming, thermoforming, extrusion blow molding or combinations thereof.

8. The composition of claim 1 fabricated into an automotive seat back, a head rest, a knee bolster, a glove box door, an instrument panel, a bumper facia, a bumper beam, a load floor, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

9. A method for blow molding the composition of claim 1 into an automotive article comprising the steps of
   i extruding the glass-filled coupled impact propylene copolymer composition in an extruder through a die,
   ii forming a molten tube-shaped parison,
   iii holding the parison within a shaping mold,
   iv blowing a gas into the mold so as to shape the parison according to the profile of the mold and
   v yielding a blow molded automotive article.

10. The method of claim 9 wherein the automotive article is a seat back, a head rest, a knee bolster, a glove box door, an instrument panel, a bumper facia, a bumper beam, a load floor, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

* * * * *